(12) United States Patent  
McGrath et al.

(10) Patent No.: US 7,778,149 B1
(45) Date of Patent: Aug. 17, 2010

(54) METHOD AND SYSTEM TO PROVIDING FAST ACCESS CHANNEL

(75) Inventors: Stephen McGrath, Mountain View, CA (US); Ian Sayers, Redwood City, CA (US); Daryl Kaiser, Los Gatos, CA (US)

(73) Assignee: Tadaaki Chigusa (JP)

( * ) Notice: Subject to any disclaimer, the term of this patent is extended or adjusted under 35 U.S.C. 154(b) by 1055 days.

(21) Appl. No.: 11/494,410

(22) Filed: Jul. 27, 2006

(51) Int. Cl.
*H04J 11/00* (2006.01)
(52) U.S. Cl. .................. 370/208; 370/203; 375/260
(58) Field of Classification Search ............... 370/208, 370/203; 375/260
See application file for complete search history.

(56) References Cited

U.S. PATENT DOCUMENTS

| | | | |
|---|---|---|---|
| 4,062,015 A | 12/1977 | Litva | |
| 4,114,157 A | 9/1978 | Hirata | |
| 4,564,838 A * | 1/1986 | Boulogne et al. | ........... 370/462 |
| 4,835,463 A | 5/1989 | Baran et al. | |
| 4,929,958 A | 5/1990 | Hodel | |
| 4,939,726 A | 7/1990 | Flammer | |
| 5,007,052 A | 4/1991 | Flammer | |
| 5,075,696 A | 12/1991 | Wilby | |
| 5,079,768 A | 1/1992 | Flammer | |
| 5,095,535 A | 3/1992 | Freeburg | |
| 5,115,433 A | 5/1992 | Baran et al. | |
| 5,130,987 A | 7/1992 | Flammer | |
| 5,223,790 A | 6/1993 | Baran et al. | |
| 5,243,536 A | 9/1993 | Bradford | |
| 5,338,332 A | 8/1994 | Baran et al. | |
| 5,365,516 A | 11/1994 | Jandrell | |
| 5,400,338 A | 3/1995 | Flammer, III | |
| 5,406,249 A | 4/1995 | Pettus | |
| 5,412,654 A | 5/1995 | Perkins | |
| 5,453,977 A | 9/1995 | Flammer, III et al. | |
| 5,465,398 A | 11/1995 | Flammer | |
| 5,471,469 A | 11/1995 | Flammer, III et al. | |
| 5,479,176 A | 12/1995 | Zavrel, Jr. | |
| 5,479,400 A | 12/1995 | Dilworth et al. | |
| 5,485,393 A | 1/1996 | Bradford | |
| 5,488,608 A | 1/1996 | Flammer, III | |
| 5,515,369 A | 5/1996 | Flammer, III et al. | |

(Continued)

FOREIGN PATENT DOCUMENTS

EP    0789468 A1    8/1997

(Continued)

OTHER PUBLICATIONS

Machine Translation of Abstract of JP 11-239154, no date, 1 page, Japan.

(Continued)

*Primary Examiner*—William Trost, IV
*Assistant Examiner*—Kyle C Kasparek (57) ABSTRACT

A system for providing a fast access channel is disclosed. The system includes a transmitter configured to transmit a first long contention symbol and one or more subsequent long contention symbols. The first long contention symbol is followed by the subsequent long contention symbols. The system further includes a receiver configured to receive the first and subsequent long contention symbols and determine a contention code and a contention channel transmitted with the contention code based on the first and subsequent long contention symbols. Each of the first and subsequent long contention symbols includes a long cyclic prefix and a number of identical contention symbols.

32 Claims, 8 Drawing Sheets

U.S. PATENT DOCUMENTS

| | | | |
|---|---|---|---|
| 5,526,357 A | 6/1996 | Jandrell | |
| 5,570,084 A | 10/1996 | Ritter et al. | |
| 5,636,216 A | 6/1997 | Fox et al. | |
| 5,664,194 A | 9/1997 | Paulsen | |
| 5,703,602 A | 12/1997 | Casebolt | |
| 5,736,959 A | 4/1998 | Patterson | |
| 5,745,483 A | 4/1998 | Nakagawa et al. | |
| 5,745,884 A | 4/1998 | Carnegie | |
| 5,764,487 A | 6/1998 | Natsume | |
| 5,767,807 A | 6/1998 | Pritchett | |
| 5,774,344 A | 6/1998 | Casebolt | |
| 5,787,077 A | 7/1998 | Kuehnel | |
| 5,790,604 A * | 8/1998 | Kelton et al. | 375/344 |
| 5,793,842 A | 8/1998 | Schloemer | |
| 5,802,447 A | 9/1998 | Miyazaki | |
| 5,818,828 A | 10/1998 | Packer et al. | |
| 5,892,908 A | 4/1999 | Hughes | |
| 5,901,143 A | 5/1999 | Rotter | |
| 5,903,566 A | 5/1999 | Flammer, III | |
| 5,946,615 A | 8/1999 | Holmes et al. | |
| 6,026,303 A | 2/2000 | Minamisawa | |
| 6,028,853 A | 2/2000 | Haartsen | |
| 6,041,232 A | 3/2000 | Jennings, III | |
| 6,049,593 A | 4/2000 | Acampora | |
| 6,072,994 A | 6/2000 | Phillips | |
| 6,104,712 A | 8/2000 | Robert et al. | |
| 6,160,647 A | 12/2000 | Gilliland | |
| 6,173,191 B1 | 1/2001 | Jennings, III | |
| 6,192,230 B1 | 2/2001 | van Bokhorst et al. | |
| 6,198,728 B1 | 3/2001 | Hulyalkar | |
| 6,298,053 B1 | 10/2001 | Flammer, III et al. | |
| 6,304,556 B1 | 10/2001 | Haas | |
| 6,307,843 B1 | 10/2001 | Okanoue | |
| 6,314,163 B1 | 11/2001 | Acampora | |
| 6,327,918 B1 | 12/2001 | Lawless | |
| 6,329,902 B1 | 12/2001 | Lee et al. | |
| 6,330,438 B1 | 12/2001 | McClelland | |
| 6,349,206 B1 | 2/2002 | Reichelt | |
| 6,430,395 B2 | 8/2002 | Arazi | |
| 6,456,675 B2 | 9/2002 | Wagner | |
| 6,522,881 B1 | 2/2003 | Feder | |
| 6,580,700 B1 | 6/2003 | Pinard | |
| 6,590,928 B1 | 7/2003 | Haartsen | |
| 6,728,554 B1 | 4/2004 | Wegner | |
| 6,801,790 B2 | 10/2004 | Rudrapatna | |
| 6,816,706 B1 | 11/2004 | Hohnstein | |
| 6,888,811 B2 | 5/2005 | Eaton | |
| 7,015,809 B1 | 3/2006 | Sayers | |
| 7,042,394 B2 | 5/2006 | Sayers | |
| 7,221,268 B2 | 5/2007 | Sayers | |
| 7,280,073 B2 | 10/2007 | Sayers | |
| 2001/0002908 A1 | 6/2001 | Rune et al. | |
| 2001/0003191 A1 | 6/2001 | Kovacs et al. | |
| 2001/0005368 A1 | 6/2001 | Rune | |
| 2001/0012757 A1 | 8/2001 | Boyle | |
| 2001/0013856 A1 | 8/2001 | Hamakada et al. | |
| 2001/0016909 A1 | 8/2001 | Gehrmann | |
| 2001/0018336 A1 | 8/2001 | Okajima et al. | |
| 2001/0022780 A1 | 9/2001 | Mizutani et al. | |
| 2001/0024443 A1 | 9/2001 | Alriksson et al. | |
| 2001/0029166 A1 | 10/2001 | Rune et al. | |
| 2001/0031626 A1 | 10/2001 | Lindskog et al. | |
| 2001/0033248 A1 | 10/2001 | Owechko | |
| 2001/0033556 A1 | 10/2001 | Krishnamurthy et al. | |
| 2001/0045914 A1 | 11/2001 | Bunker et al. | |
| 2001/0049295 A1 | 12/2001 | Matsuoka | |
| 2002/0004817 A1 | 1/2002 | Pham et al. | |
| 2002/0016838 A1 | 2/2002 | Geluc et al. | |
| 2002/0018448 A1 | 2/2002 | Amis et al. | |
| 2002/0054575 A1 | 5/2002 | Cho | |
| 2003/0038747 A1 | 2/2003 | Patel | |
| 2003/0087650 A1 | 5/2003 | Aarnio | |
| 2003/0161268 A1 | 8/2003 | Larsson | |
| 2004/0223476 A1 | 11/2004 | Jose | |
| 2005/0277808 A1 | 12/2005 | Sonnenschein | |
| 2006/0058022 A1 * | 3/2006 | Webster et al. | 455/423 |
| 2007/0002551 A1 | 1/2007 | Ger | |
| 2007/0071036 A1 * | 3/2007 | Okunev et al. | 370/503 |
| 2007/0109980 A1 | 5/2007 | Awater | |
| 2007/0254592 A1 * | 11/2007 | McCallister et al. | 455/67.11 |
| 2008/0310531 A1 * | 12/2008 | Bai et al. | 375/260 |

FOREIGN PATENT DOCUMENTS

| | | |
|---|---|---|
| EP | 0852407 A2 | 8/1998 |
| EP | 1202389 A1 | 5/2002 |
| JP | 09-083528 | 3/1997 |
| JP | 11-239154 | 8/1999 |
| WO | 95/28780 A1 | 10/1985 |
| WO | WO 95/28780 A1 | 10/1995 |
| WO | 96/00468 | 1/1996 |
| WO | WO 96/00468 A1 | 1/1996 |
| WO | 97/109673 A1 | 3/1997 |
| WO | WO 97/09673 A1 | 3/1997 |
| WO | 01/26328 A2 | 4/2001 |
| WO | 01/86850 A1 | 11/2001 |
| WO | WO 01/86850 A1 | 11/2001 |
| WO | 02/19740 A1 | 3/2002 |
| WO | WO 02/19740 A1 | 3/2002 |
| WO | 00/16508 A1 | 3/2003 |
| WO | 2004/040692 A1 | 5/2004 |
| WO | 2005/074197 A1 | 8/2005 |

OTHER PUBLICATIONS

Machine Translation of Abstract of JP 09-083528, no date, 1 page, Japan.

IEEE Std 802.11, 1999 / 8802-11 (ISO/IEC 8802-11:1999) Std for Info Technology—LAN/ MAN—Specific requirements—Part 11: Wireless LAN (MAC) and PHY Specs, IEEE NY, NY.

IEEE Std 802.11B-1999 Std for Telecomm and Info Exchange Between Systems—LAN/MAN Specific Requirements—Part 11: Wireless (MAC) & PHY Specs: 2.4 GHz Band, IEEE NY, NY.

IEEE Std 802.16/2001 Std for Local and Metropolitan Area Netwks Part 16: Air Interface for Fixed Broadband Wireless Access Systems, IEEE 3 Park Avenue, New York, NY 10016-5997.

IEEE Std 802.11, 1999/8802-11 (ISO/IEC 8802-11:1999) Std for Info Technology—LAN/ MAN—Specific requirements—Part 11: Wireless LAN (MAC) and Phy Specs, IEEE NY, NY (528 pages).

IEEE Std 802.11B-1999 Std for Telecomm and Info Exchange Between Systems—LAN/MAN Specific Requirements—Part 11: Wireless (MAC) & PHY Specs: 2.4 GHz Band, IEEE NY, NY (96 pages).

IEEE Std 802.16-2001 Std for Local and Metropolitan Area Netwks Part 16: Air Interface for Fixed Broadband Wireless Access Systems, IEEE 3 Park Avenue, New York, NY 10016-5997 (349 pages).

"3GPP TS 23.107 v6.3.0 Technical Specification Group Services and System Aspects; Quality of Service (OoS) concept and architecture (Release 6)," 3GPP Generation Partnership Project, Jun. 2005 (2005-2006), XP002354258 (40 pages).

"Digital cellular telecommunications system (Phase 2+); Universal Mobile Telecommunications System (UMTS); End-to-end Quality of Service (QoS) concept and architecture (3GPP TS 23.207 version 5.9.0 Release 5); ETSI TS 123207," ETSI Standards, European Telecommunications Standards Institute, Sophia-Antipo, FR, vol. 3-SA2, No. V590, Mar. 2004, XP0104016491 ISSN: 0000-0001 (48 pages).

PCT "Notification Concerning Transmittal of International Preliminary Report on Patentability", Int'l Search Authority, Int'l patent application PCT/US06/26552 dated Jan. 24, 2008 (6 pages.).

PCT "Written Opinion" for PCT/US03/23623 dated May 24, 2004 (7 pages).

PCT "Notification of Transmittal of the International Search Report or the Declaration" for PCT/US03/23623 dated Mar. 5, 2004 (6 pages).

PCT "Notification of Transmittal of International Preliminary Examination Report" for PCT/US03/23623 dated Mar. 17, 2005 (8 pages).
EPO "Extended European Search Report" for EP 05254384.0.2411 dated Dec. 8, 2005 (9 pages).
EPO "European Search Report" for EP 05254384.0.2411 dated Aug 9, 2007 (9 pages).
EPO "Extended European Search Report" for EP 05254385.7-2411 date Dec. 27, 2005( 8 pages).
EPO "Extended European Search Report" for EP 05254385.7-2411 dated Aug. 17, 2007 (8 pages).
PCT "Notification of Transmittal of the International Search Report and the Written Opinion of the International Searching Authority", Int'l Search Authority, Int'l patent application PCT/US06/26552 dated Feb. 5, 2007 (11 pages).

* cited by examiner

| Signal | I/O | Source/Sink | Description |
| --- | --- | --- | --- |
| RST_N | I | Reset controller | Global asynchronous reset combined with synchronous Tx reset |
| SYSCLK | I | External | System Clock |
| TX_SOF | I | Transmit PLCP | Tx start of frame |
| FACH_EN | I | Transmit PLCP | FACH mode enable |
| CONTENTION_CODE[2:0] | I | External | Index of the contention code |
| NB_CHANNEL[1:0] | I | External | Number of contention channels to transmit on.<br>'00': channel_0 only<br>'01': channel_0 & channel_1<br>'10': channel_0 & channel_1 & channel_2<br>'11': undefined |
| CHANNEL_0[3:0] | I | External | Index of channel 0 |
| CHANNEL_1[3:0] | I | External | Index of channel 1 |
| CHANNEL_2[3:0] | I | External | Index of channel 2 |
| IFFT_START_IND | O | FFT/IFFT block | IFFT start indication |
| IFFT_START_ACK | I | FFT/IFFT block | IFFT start acknowledgement |
| FACH_SYM_CNT[3:0] | I | External | Number of the code symbols |
| TX_FACH_IND | I | External | Contention code indication |
| TX_FACH_ACK | O | External | Contention code acknowledge |
| FFT_M0_EN | O | Input memory of an FFT/IFFT block | FFT Memory 0 enable |
| FFT_M0_WE | O | Input memory of an FFT/IFFT block | FFT Memory 0 write enable |
| FFT_M0_ADDR | O | Input memory of an FFT/IFFT block | FFT Memory 0 address |
| FFT_M0_WDATA | O | Input memory of an FFT/IFFT block | FFT Memory 0 write data |
| FFT_M1_EN | O | Input memory of an FFT/IFFT block | FFT Memory 1 enable |
| FFT_M1_WE | O | Input memory of an FFT/IFFT block | FFT Memory 1 write enable |
| FFT_M1_ADDR | O | Input memory of an FFT/IFFT block | FFT Memory 1 address |
| FFT_M1_WDATA | O | Input memory of an FFT/IFFT block | FFT Memory 1 write data |
| TXFACH_DONE | O | Transmit PLCP | End of operation indication. |

| Signal | I/O | Source/Sink | Description |
| --- | --- | --- | --- |
| RST_N | I | Reset controller | Global asynchronous reset combined with synchronous Tx reset |
| SYSCLK | I | External | System Clock |
| TX_SOF | I | Transmit PLCP | Tx start of frame |
| RX_SOF | I | Receive controller | Rx start of frame |
| RX_EOF | I | Receive PLCP | Rx end of frame |
| RX_FACH_EN | I | Receive PLCP | Indicates FACH mode |
| FFT_DONE_IND | I | FFT block | FFT processing ready indication |
| THRESH_MODE | I | System register | Threshold mode (0 – static, 1 - dynamic) |
| UP1_EN | I | System register | Enable threshold calculation on the first contention code symbol (1 - enabled) |
| UP2_EN | I | System register | Enable threshold calculation on the second contention code symbol (1 - enabled) |
| UP3_EN | I | System register | Enable threshold calculation on the third contention code symbol (1 - enabled) |
| UP4_EN | I | System register | Enable threshold calculation on the fourth contention code symbol (1 - enabled) |
| ALPHA[2:0] | I | System register | Alpha value to threshold calculation |
| BETA[11:0] | I | System register | Beta value to threshold calculation <20,4> |
| UPDATE_MODE[10] | I | System register | Threshold calculation mode selection |
| CH_MAP[12:0] | I | System register | Channel map |
| FACH_SYM_CNT[3:0] | I | Receive PLCP | Number of code symbols |
| PWR_TRESH_INIT[19:0] | I | System registers | Initial power threshold value in dynamic mode, power threshold in static mode |
| FFT_M2_DATA | I | FFT memory | FFT memory2 data |
| FFT_M3_DATA | I | FFT memory | FFT memory3 data |
| RX_FACH_DONE | O | Receive PLCP | Receive FACH processing is ready |
| FFT_DONE_ACK | O | FFT block | FFT processing ready acknowledge |
| FFT_M2_EN | O | FFT memory | FFT memory2 enable |
| FFT_M2_ADDR[5:0] | O | FFT memory | FFT memory2 address |
| FFT_M3_EN | O | FFT memory | FFT memory3 enable |
| FFT_M3_ADDR[5:0] | O | FFT memory | FFT memory3 address |
| DETECT_IND | O | Receive PLCP | Indicates valid code on the current channel |
| CODE_IDX[2:0] | O | Receive PLCP | Index of the received code on the current channel |
| OUTPUT_EN | O | Receive PLCP | Clocks out the code_index and detect_ind values |

*FIG. 8*

| Contention channel index | Carrier offset index 0 | Carrier offset index 1 | Carrier offset index 2 | Carrier offset index 3 |
|---|---|---|---|---|
| 0 | -26 | -13 | +1 | +14 |
| 1 | -25 | -12 | +2 | +15 |
| ... | ... | ... | ... | ... |
| k | k-26 | k-13 | k+1 | k+14 |
| ... | ... | ... | ... | ... |
| 12 | -14 | -1 | 13 | 26 |

*FIG. 9*

| Contention code index | bit 0 | bit 1 | bit 2 | bit 3 |
|---|---|---|---|---|
| 0 | 1 | 1 | 1 | 1 |
| 1 | 1 | -1 | 1 | -1 |
| 2 | 1 | 1 | -1 | -1 |
| 3 | 1 | -1 | -1 | 1 |
| 4 | -1 | -1 | -1 | -1 |
| 5 | -1 | 1 | -1 | 1 |
| 6 | -1 | -1 | 1 | 1 |
| 7 | -1 | 1 | 1 | -1 |

*FIG. 10*

METHOD AND SYSTEM TO PROVIDING FAST ACCESS CHANNEL

FIELD OF THE INVENTION

The present invention generally relates to wireless communications and, in particular, to methods and systems that are capable of providing efficient channel access in wireless communications.

BACKGROUND OF THE INVENTION

IEEE 802.16a is a wireless communications specification for metropolitan area networks (MANs). The 802.16a standard was developed for wireless MANs operating on licensed and unlicensed radio-frequency (RF) bands between 2 GHz and 11 GHz, at data speeds of up to 75 megabits per second (Mbps), with low latency and efficient use of spectrum space. Security is enhanced by encryption features. The contention symbols are based on OFDM (orthogonal frequency division multiplexing) symbols similar in construction to 802.16a (OFDM mode) or 802.11a symbols.

Figure 1:
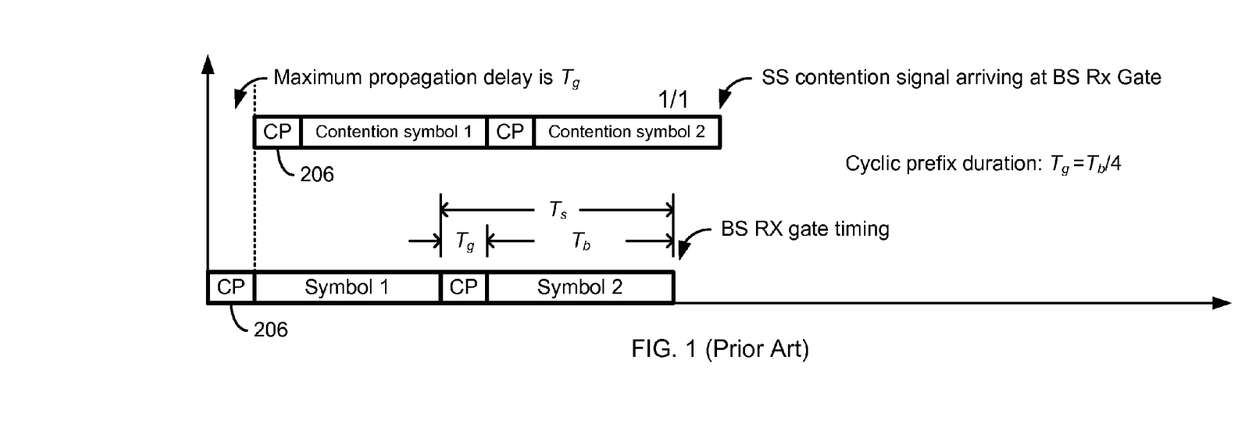
FIG. 1 shows a symbol timeline according to the 802.16a standard.

The 802.16a focused contention transmission includes two (2) consecutive contention symbols, each beginning with a cyclic prefix and containing two hundred (200) usable subcarriers. The subcarriers are divided into fifty (50) contention channels of four (4) subcarriers apiece. The lowest numbered contention channel uses subcarriers 0, 50, 100 and 150. The highest numbered contention channel uses subcarriers 49, 99, 149 and 199. The symbol timeline is shown in FIG. 1. As shown in FIG. 1, under the 802.16a standard, the maximum permissible propagation delay for effective reception of symbols at a receiver is $T_g$, which represents the time it takes to transmit the cyclic prefix. In various instances, such maximum permissible propagation delay may be exceeded thereby rendering reception of symbols by the receiver ineffective.

Hence, it would be desirable to provide methods and systems that are capable of, amongst other things, providing channel access in an efficient manner and extending the maximum supported propagation delay.

SUMMARY OF THE INVENTION

In one embodiment, a system for providing a fast access channel is disclosed. The system includes a transmitter configured to transmit a first long contention symbol and a second long contention symbol. The first long contention symbol is followed by the second long contention symbol. The system further includes a receiver configured to receive the first and second long contention symbols and determine a contention code and a contention channel upon which that contention code was transmitted based on the first and second long contention symbols. Each of the first and second long contention symbols includes a long cyclic prefix and a number of identical contention symbols.

In another embodiment, a system for providing a fast access channel is disclosed. The system includes a transmitter configured to transmit a first long contention symbol and a second long contention symbol. The first long contention symbol is followed by the second long contention symbol. Each of the first and second long contention symbols includes a long cyclic prefix and a plurality of contention symbols. The system further includes a receiver configured to: receive the first and second long contention symbols, retrieve information relating to a selected contention channel from the first and second long contention symbols, remove phase ramp and phase offset information from the retrieved information to generate refined information relating to the selected contention channel, perform correlation coefficient computations between the refined information relating to the selected contention channel and a number of contention codes, and determine a contention code from the contention codes based on results of the correlation coefficient computations.

In some embodiments, the transmitter may be configured to send three (3), four (4) or more contiguous long contention symbols. Each such long contention symbol includes a long cyclic prefix and a plurality of contention symbols. The system further includes a receiver configured to: receive a plurality of long contention symbols, retrieve information relating to a selected contention channel from the plurality of long contention symbols, remove phase ramp and phase offset information from the retrieved information to generate refined information relating to the selected contention channel, perform correlation coefficient computations between the refined information relating to the selected contention channel and a number of contention codes, and determine a contention code from the contention codes based on results of the correlation coefficient computations.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

Aspects, advantages and novel features of the present invention will become apparent from the following description of the invention presented in conjunction with the accompanying drawings:

FIG. 5 is a table providing the interface description of the transmitting station according to one embodiment of the present invention;

FIG. 8 is a table providing the interface description of the receiving station according to one embodiment of the present invention;

DETAILED DESCRIPTION

Figure 2:
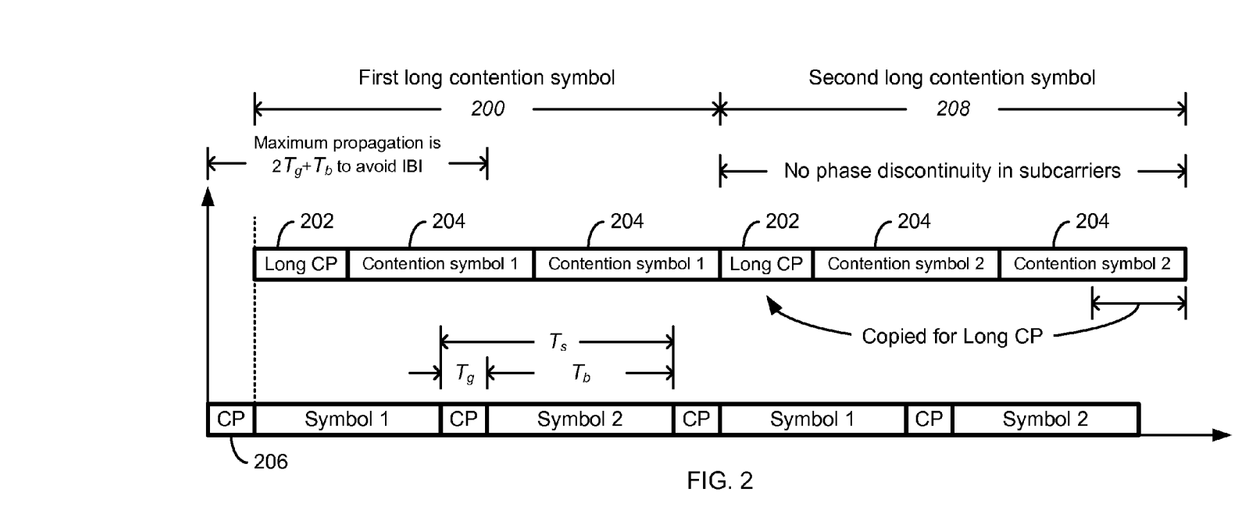
FIG. 2 shows a symbol timeline according to one embodiment of the present invention.

One or more embodiments of the present invention will now be described. The present invention extends the concept of 802.16a focused contention. In one embodiment, the present invention provides a fast access channel (FACH)

which is a unidirectional (reverse) channel. FIG. 2 illustrates a symbol timeline according to one embodiment of the present invention. As shown in FIG. 2, each long contention symbol 200, 208 includes a long cyclic prefix 202 followed by multiple copies 204 of the same contention symbol. In this example shown, there are two (2) copies of the same contention symbol 204. However, it should be understood that the number of copies 204 to be included in each long contention symbol 200, 208 may vary depending on each application; in other instances, three (3), four (4), or more copies may be used. Based on the disclosure and teachings provided herein, a person of ordinary skill in the art will readily appreciate and understand how to implement the appropriate number of copies for use in each long contention symbol 200, 208.

Each of the contention symbols 204 may be constructed in a similar fashion as an 802.16a contention symbol. The length of a contention symbol 204 may be the same as the usable part of a data symbol. Depending on the version of the physical layer that is used, the contention symbol 204 may be, for example, similar to an 802.11a symbol or an 802.16a symbol. However, those of ordinary skill in the art will readily appreciate and understand that similarity to 802.11a or 802.16a symbols is not necessary and other types of contention symbols may be used. Each data symbol is constructed by populating a subset $N_{fft}$ of the subcarriers of an IFFT (Inverse Fast Fourier Transform) of length $N_{fft\text{-}TOTAL}$ with modulated data. Only $N_{fft}$ subcarriers carry usable data.

The long cyclic prefix 202 is multiple times the length of a normal data symbol cyclic prefix 206. In one embodiment, the extension factor matches the number of contention symbols 204 in the long contention symbol 200. This produces a long contention symbol 200 that is exactly multiple times the length of a normal data symbol.

Contention codes and constellation as used in connection with an embodiment of the present invention will now be described. Each contention code defines four (4) BPSK (binary phase shift keying) states, which map onto four (4) subcarriers collectively corresponding to a contention channel. Those of ordinary skill in the art will readily appreciate and understand that a different number of subcarriers and different modulation schemes may alternatively be used. The subcarriers used by each contention channel are spaced at (Nfft/4)-subcarrier intervals, where Nfft is the number of usable subcarriers in the orthogonal frequency division multiplexed (OFDM) symbol, and each subcarrier is transmitted using BPSK modulation. All transmitted contention channels in the first long contention symbol 200 are sent with a calibration contention code. The calibration contention code is used by a receiving station as a reference against which subsequent contention codes are evaluated. All transmitted contention channels in the second long contention symbol 208 are sent with the information-bearing contention code selected by a transmitting station. The receiving station measures the contention channel's phase difference per subcarrier from the first long contention symbol 200 to the second long contention symbol 208 and determines the information content (i.e., identifies which contention code was sent by the transmitting station). Details of the transmitting and receiving stations will be further described below.

In embodiments in which more than two (2) long contention symbols 200, 208 are transmitted, the transmitted contention channels in the third and any subsequent long contention symbols are sent with the information-bearing contention code(s) selected by a transmitting station. A receiving station measures the contention channel's phase difference per subcarrier from the first long contention symbol 200 to the third (or subsequent) long contention symbol(s) and determines the information content (i.e., identifies which contention code was sent by the transmitting station).

Figure 3:
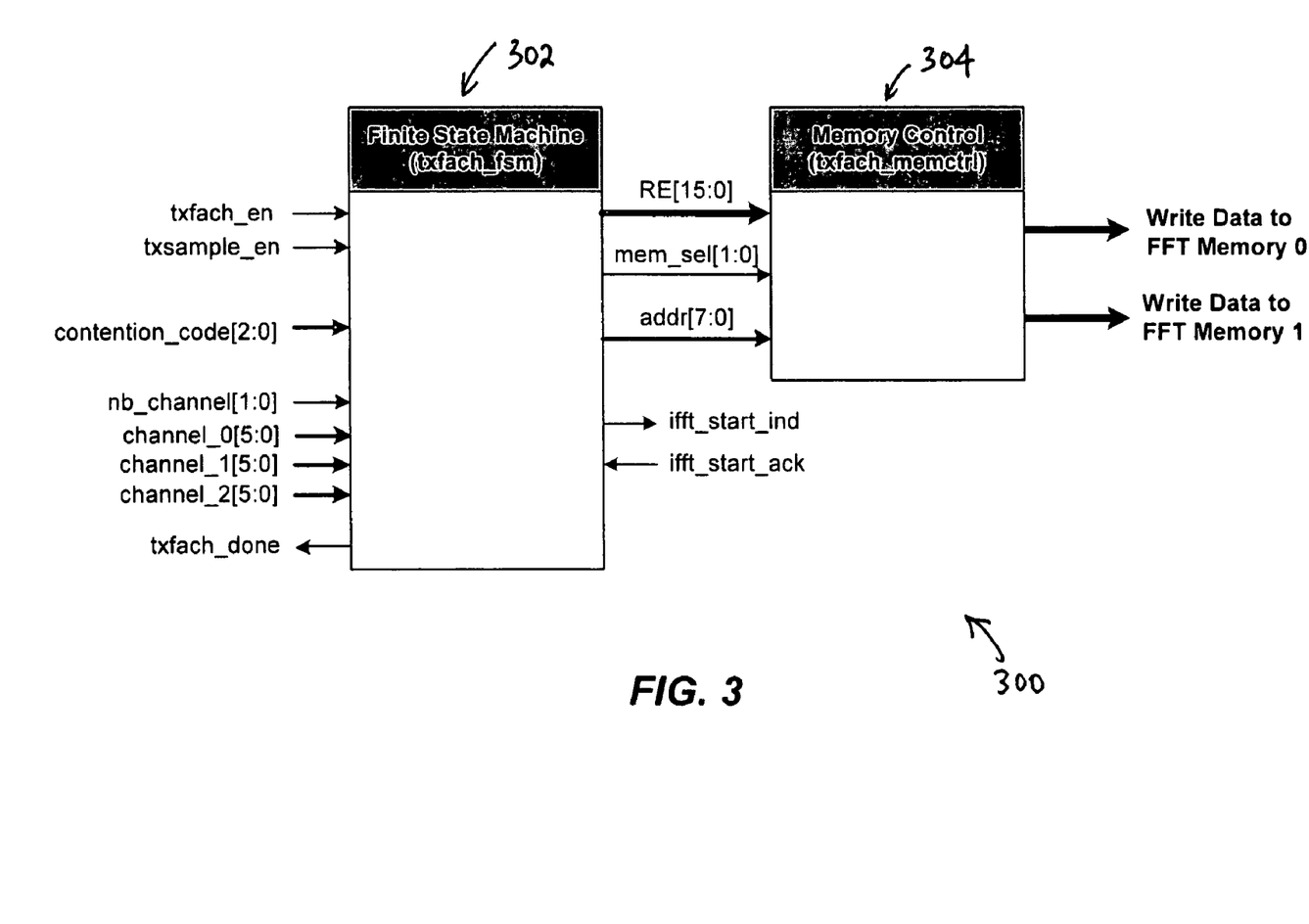
FIG. 3 is a simplified block diagram illustrating a transmitting station according to one embodiment of the present invention.
Figure 4:
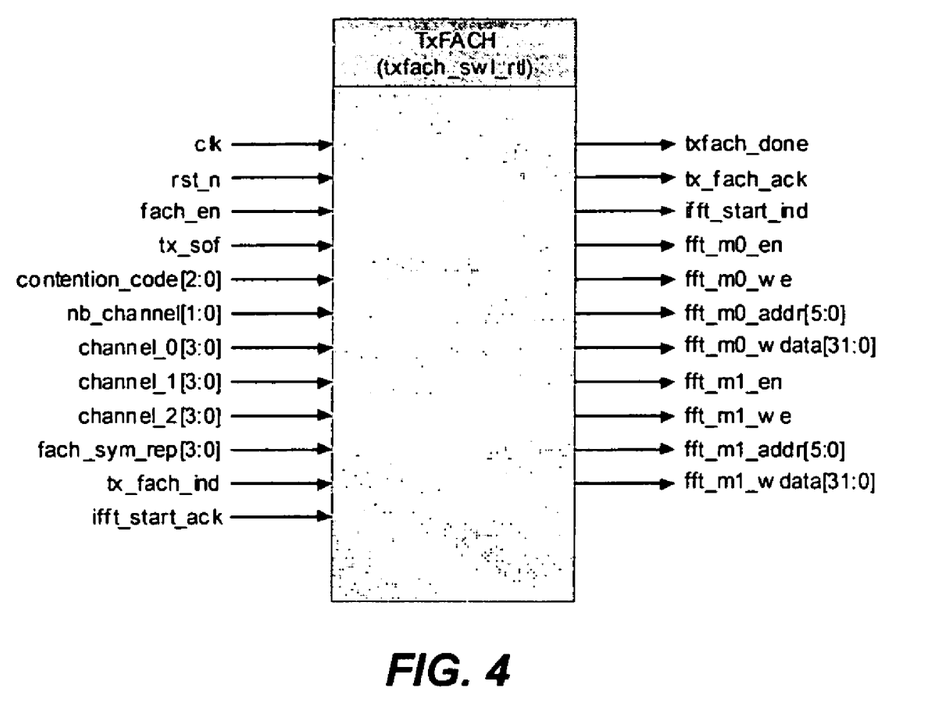
FIG. 4 shows the interface configuration of the transmitting station according to one embodiment of the present invention.

FIG. 3 illustrates a transmitting station or transmitter 300 according to one embodiment of the present invention. In one embodiment, the transmitter 300 includes a finite state machine 302 and a memory control 304. FIG. 4 illustrates the interface configuration of the transmitter 300 according to one embodiment of the present invention. FIG. 5 further provides the interface description for the transmitter 300.

The transmitter 300 is used to provide symbol generation for use with the FACH. The transmitter 300 may be incorporated into a master station or a slave station. The master and slave stations can be any one of a base station, access point or subscriber terminal. In the case of a subscriber terminal, the subscriber terminal may comprise a mobile device such as, for example, a consumer product or a mobile phone or terminal. The transmitter 300 is configured to perform a number of functions. The transmitter 300 is able to generate an OFDM symbol including a calibration contention code on specifically programmed contention channels. The transmitter 300 is also able to generate an OFDM symbol including a programmable code transmitted on specifically programmed contention channels. The transmitter 300 employs a handshake mechanism for communication with a downstream IFFT processor and is further able to write symbols to IFFT input memories.

Once enabled, the transmitter 300 has exclusive control over the interface to the IFFT processor. This includes both the memory interface and handshaking mechanism. The transmitter 300 first generates an $N_{fft}$ subcarrier symbol in the IFFT input memory. This symbol contains a calibration contention code on one (1), two (2) or three (3) specified contention channels, leaving all other contention channels unused. The number and positions of the contention channels are programmable.

Then, a similar symbol is generated in the IFFT input memory. This symbol uses the same contention channels. The value of the contention code placed on each contention channel is specified by an input value. Each symbol includes $N_{fft}$ data subcarriers divided into $N_{fft}/4$ contention channels. Each contention channel has a set of four (4) subcarriers, with adjacent subcarriers in the same set spaced $N_{fft}/4$ subcarriers apart. For example, the first contention channel would have subcarrier channels 0, $N_{fft}/4$, $2*N_{fft}/4$, $3*N_{fft}/4$; the second contention channel would have subcarrier channels 1, $N_{fft}/4+1$, $2*N_{fft}/4+1$, $3*N_{fft}/4+1$, etc.

The purpose of having two (2) or more different symbols 204 is to allow measurement of phase difference between a known contention code on the first symbol 204 and an unknown contention code on a subsequent symbol 204 on corresponding subcarrier frequencies, thereby allowing a receiving station to remove phase noise from the second symbol 204 and obtain the correction contention information. Each transmitter 300 transmits on certain channel(s) so the phase relationship is only applicable to corresponding channels of each symbol.

Some of the functions described above are further illustrated with respect to the finite state machine 302 and the memory control 304. The finite state machine 302 is configured to control the overall operation of the transmitter 300. The finite state machine 302 will remain idle until it is set to an active state. The inputs "contention_code_0", "contention_code_1", "contention_code_2", "nb_channel", "channel_0", "channel_1" and "channel_2" have valid values when the active state is initiated. The inputs "contention_code_1", "contention_code_2", "channel_1" and "channel_2" depend on the value of "nb_channel". Once the active state is initiated, the finite state machine 302 loads two (2) contention symbols to the IFFT processor. Each contention symbol 204 includes $N_{ft}$ subcarriers.

A symbol is constructed by assigning complex values to each of the $N_{ft}$ usable data subcarriers. This is sub-divided into $N_{ft}/4$ contention channels. Each contention channel is made up of four (4) subcarriers separated by $N_{ft}/4$ frequency divisions (i.e., the lowest numbered contention channel uses subcarriers 0, $N_{ft}/4$, $2*N_{ft}/4$, $3*N_{ft}/4$).

The first contention symbol 204 is generated using a calibration contention code on the contention channels indicated by "channels_0:2". The second contention symbol 204 is generated using the contention codes indicated by "contention_code_0:2" on the contention channels indicated by "channels_0:2". All other channels are not populated. The number of channels transmitted is defined by "nb_channel".

Once the first contention symbol 204 has been read from the "contention code_0:2" input, the FSM determines whether any subsequent contention symbols 204 must be generated. If present, subsequent contention symbols 204 are generated using the contention code indicated by "contention_code_0:2" and are transmitted on the same contention channels as described above.

Once the IFFT processor confirms that all symbols have been processed, the finite state machine 302 returns to the idle state.

The memory control 304 is configured to execute the interface protocol required to access external memory banks.

Figure 6:
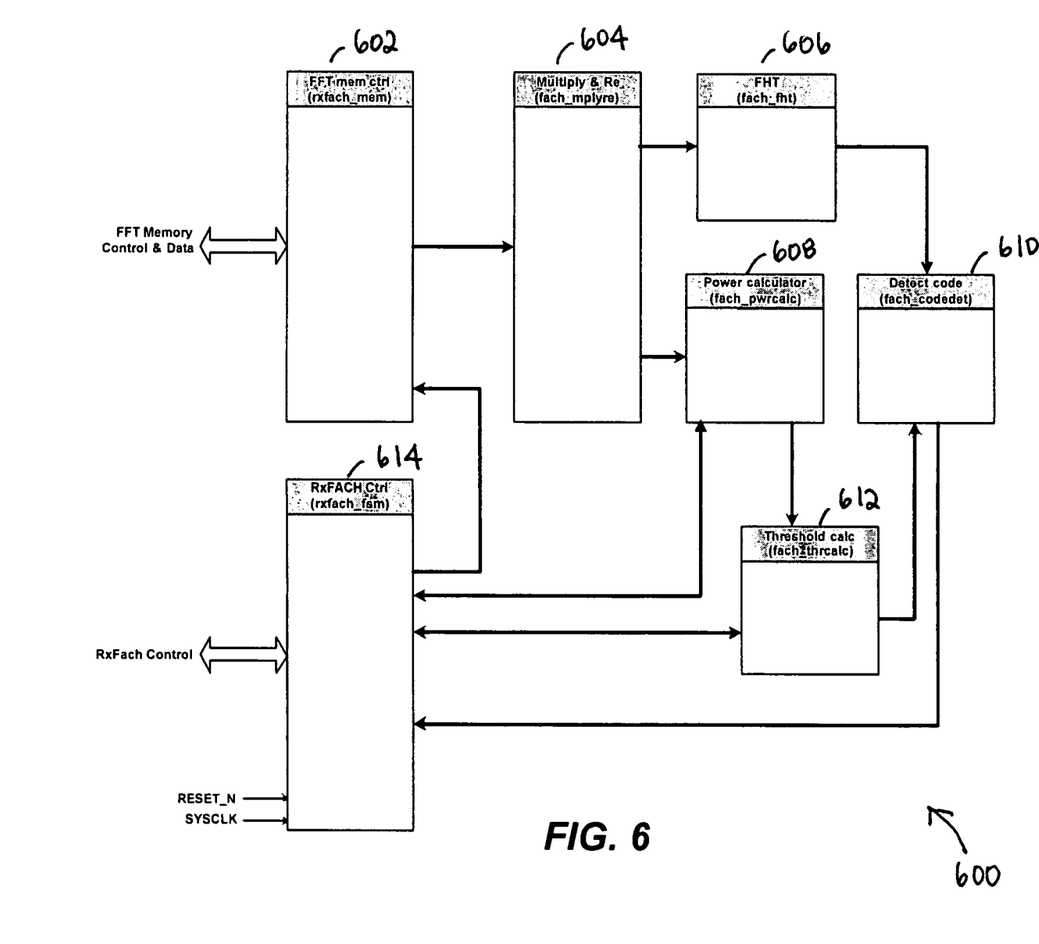
FIG. 6 is a simplified block diagram illustrating a receiving station according to one embodiment of the present invention.
Figure 7:
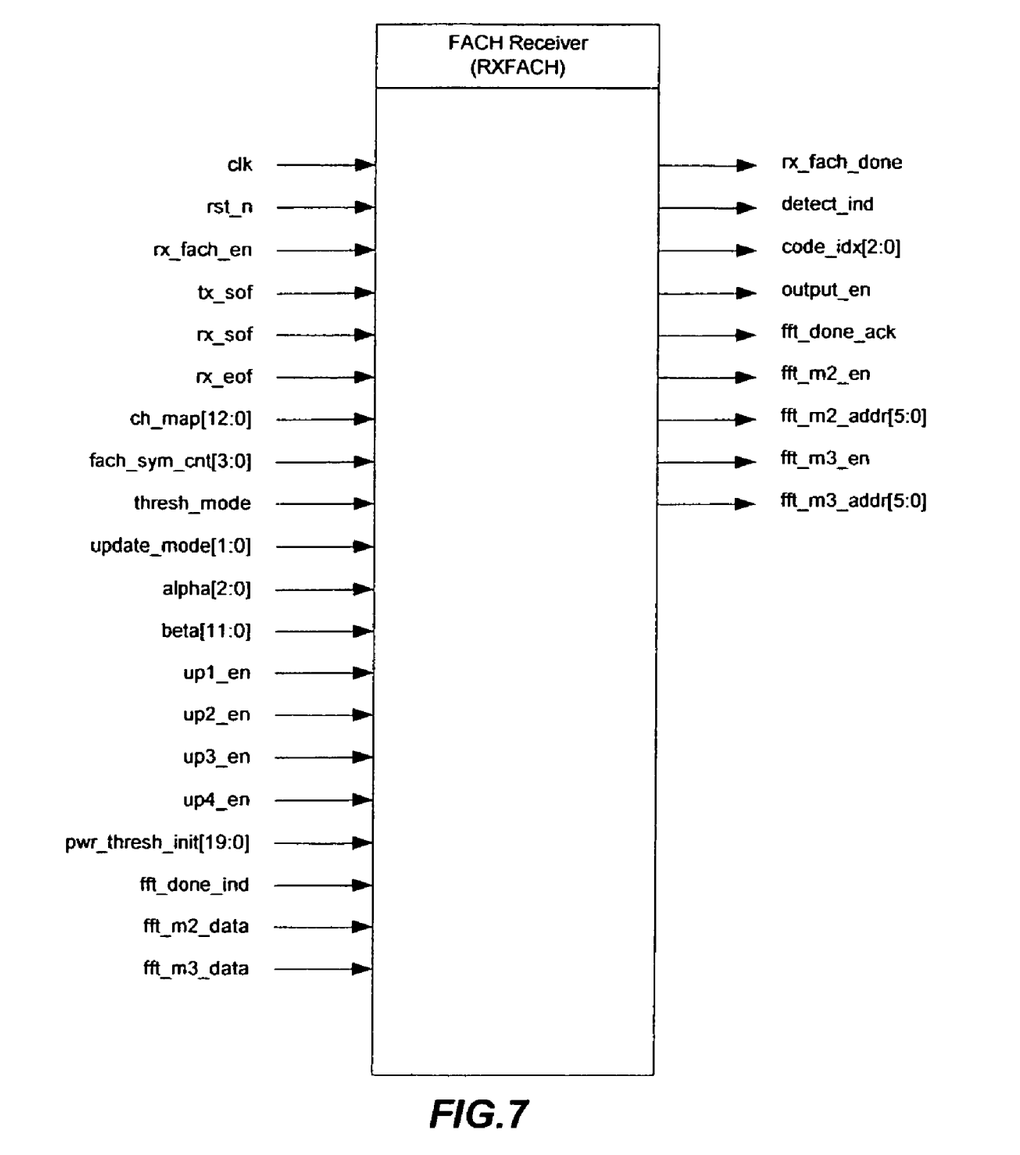
FIG. 7 shows the interface configuration of the receiving station according to one embodiment of the present invention.

FIG. 6 illustrates a receiving station or receiver 600 according to one embodiment of the present invention. FIG. 7 illustrates the interface configuration of the receiver 600 according to one embodiment of the present invention. FIG. 8 further provides the interface description for the receiver 600.

As noted above, the transmitter 300 may transmit simultaneously on one (1), two (2) or three (3) selected OFDM contention channels during each FACH interval. Multiple transmitters 30 may transmit simultaneously on different contention channels during the same FACH interval. In one embodiment, the contention channels are provided in FIG. 9.

Each transmitter 300 may transmit more than one (1) contiguous contention symbols, each of which contains multiple channels. Each transmitter may transmit on channels which are elements of any one or more of the contiguous contention symbols.

The receiver 600 may be incorporated into a base station or terminal. The receiver 600 is configured to detect and decode all of the simultaneous transmissions from various transmitters 300.

Figure 9:
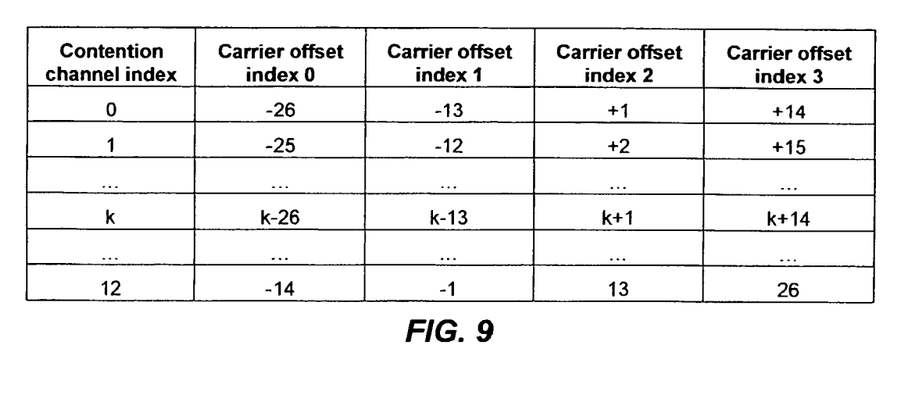
FIG. 9 is a table showing a number of contention channels according to one embodiment of the present invention.

As mentioned above, the FACH transmission may include two (2) or more consecutive long contention symbols 200, 208. Each long contention symbol 200, 208 begins with a long cyclic prefix 202 and includes $N_{ft}$ usable subcarriers. The subcarriers are divided into $N_{ft}/4$ contention channels of four (4) subcarriers apiece, as shown in FIG. 9.

Figure 10:
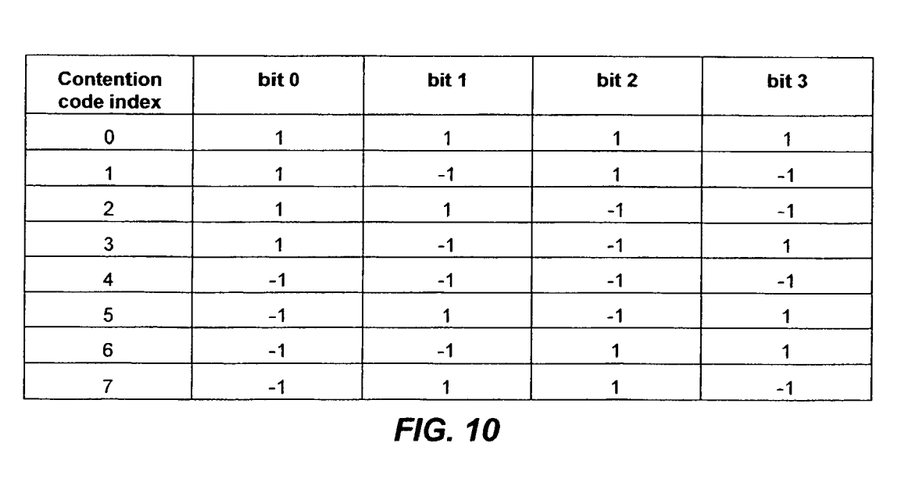
FIG. 10 is a table showing a number of contention codes according to one embodiment of the present invention.

Each long contention symbol 200, 208 includes a long cyclic prefix 202 followed by multiple copies of the same contention symbol 204, each of which may be constructed in a similar fashion as an 802.16a contention symbol. A contention symbol 204 may represent one of a number of contention codes as shown in FIG. 10. The number of contention codes may vary depending on the design of each system or application. Also, as noted above, the number of copies of the same contention symbol 204 may vary. For example, the number of copies may be two (2), three (3), four (4) or more. In one embodiment, the long cyclic prefix 202 is multiple times the length of the normal cyclic prefix 206, where the extension factor matches the number of contention symbols 204 in the long contention symbols 200. The long cyclic prefix 202 and the redundant contention symbols 204 are removed by the physical layer of the receiver 600 before the FFT (Fast Fourier Transform) operation.

All transmitted contention channels in the first long contention symbol 200 are sent with a calibration contention code (which may correspond to the contention code "0" in FIG. 10). All transmitted contention channels in the second long contention symbol 208 are sent with the information-bearing contention code selected by the transmitter 300. The receiver 600 measures the contention channel's phase difference per subcarrier from the first long contention symbol 200 to the second long contention symbol 208 and determines the information content (i.e., identifies which contention code was sent).

FIG. 6 illustrates one embodiment of the receiver 600. The receiver 600 includes a FFT memory controller 602, a removal module 604, an FHT (Fast Hadamard Transform) module 606, a power calculator 608, a code detector 610, a threshold calculator 612 and a finite state machine 614.

The FFT memory controller 602 reads two (2) complex numbers simultaneously from corresponding FFT memory banks. These complex numbers are scaled down to a predetermined number of bits, e.g., eight (8) bits. The FFT memory controller 602 then further reads the FFT memory banks for a contention channel in a predetermined number of clock cycles, e.g., eight (8) clock cycles. In each two-clock cycle, two subcarrier components are read simultaneously from the memory banks for the first and second long contention symbols 200, 208 respectively. The outputs from the FFT memory controller 602 are then forwarded to the removal module 604.

The removal module 604 is configured to remove the phase ramp and local oscillator (LO) phase offset from the input signals by multiplying the complex conjugate value of $x_{n,k}$ by $x_{n+1,k}$ and outputting the real part of the result, i.e., $$\tilde{y}_{n,k} = Re\{x^*_{n,k} * x_{n+1,k}\}$$

$$\tilde{y}_{n,k} = Re\{x_{n,k}\}Re\{x_{n+1,k}\} + Im\{x_{n,k}\}Im\{x_{n+1,k}\}$$

For a contention channel, the removal module 604 processes its inputs on a predetermined number of clock cycles, e.g., eight (8) clock cycles. During the first two clocks, $x_{n,0}$ and $x_{n+1,0}$ are read from the inputs and $y_{n,0}$ is computed and stored in an output buffer. For the subsequent clocks, the remaining three (3) subcarrier components ($x_{n,k}$ and $x_{n+1,k}$) are processed in a similar manner.

Outputs from the removal module 604 are then forwarded to the FHT module 606. The FHT module 606 correlates the outputs $\tilde{y}_{n,k}$ received from the removal module 604 with the contention codes as shown in FIG. 10. In this example, the correlation is performed with eight (8) contention codes. However, based on the disclosure and teachings provided herein, the number of contention codes to be used for correlation may vary depending on the design of each system or application. The correlation to be performed is represented as follows:

$$\begin{bmatrix} \tilde{\rho}_0 \\ \tilde{\rho}_1 \\ \tilde{\rho}_2 \\ \tilde{\rho}_3 \end{bmatrix} = \begin{bmatrix} \tilde{y}_{n,0} + \tilde{y}_{n,1} + \tilde{y}_{n,2} + \tilde{y}_{n,3} \\ \tilde{y}_{n,0} - \tilde{y}_{n,1} + \tilde{y}_{n,2} - \tilde{y}_{n,3} \\ \tilde{y}_{n,0} + \tilde{y}_{n,1} - \tilde{y}_{n,2} - \tilde{y}_{n,3} \\ \tilde{y}_{n,0} - \tilde{y}_{n,1} - \tilde{y}_{n,2} + \tilde{y}_{n,3} \end{bmatrix}$$

$$[\tilde{\rho}_0 \ \tilde{\rho}_1 \ \tilde{\rho}_2 \ \tilde{\rho}_3 \ \tilde{\rho}_4 \ \tilde{\rho}_5 \ \tilde{\rho}_6 \ \tilde{\rho}_7]^T = [\tilde{\rho}_0 \ \tilde{\rho}_1 \ \tilde{\rho}_2 \ \tilde{\rho}_3 \ -\tilde{\rho}_0 \ -\tilde{\rho}_1 \ -\tilde{\rho}_2 \ -\tilde{\rho}_3]^T$$

The computed correlated coefficients $\tilde{\rho}_{0,\ldots,7}$ are then transferred to the code detector 610.

In one implementation, the code detector 610 is configured to compare each correlation coefficient $\tilde{\rho}_{0,\ldots,7}$ with a threshold coefficient $\tilde{\rho}_{threshold}$. If the comparisons show that any correlation coefficient $\tilde{\rho}_k$ is above the threshold coefficient, then a valid contention code is detected. A detection indicator flag is set to "1" to indicate the presence of a valid contention code; otherwise, the detection indicator flag is set to "0".

Outputs from the removal module 604 are also forwarded to the power calculator 608. The power calculator 608 is configured to compute the power of the signal in the contention channel as follows:

$$\|\tilde{y}_n\|^2 = \sum_{k=0}^{3} \tilde{y}_{n,k}^2$$

The computed power is compared to a threshold level. In one implementation, this threshold level is programmable. In another implementation as described below, the threshold level is adaptive. The power calculator 608 outputs the result of this comparison to the threshold calculator 612. The result is used to indicate whether the power level in the contention channel is suitable for code detection. If the result indicates that the power level in the contention channel is suitable for code detection, the threshold calculator 612 accordingly directs the code detector 610 to perform code detection as described above; otherwise, the threshold calculator 612 directs the code detector 610 to perform error handling processes.

In one implementation, the threshold calculator 612 is configured to update the estimate of the noise level that is used by the code detector 610 to perform code detection. Since code detection is based on the measured noise floor. The threshold calculator 612 maintains an estimate of the noise floor by exponentially averaging the received power in subcarriers that are inactive. The averaging formula is as follows:

$$\sigma_n^2(k+1) = \alpha\sigma_n^2(k) + (1-\alpha)\hat{\sigma}_n^2(k)$$

$\sigma_n^2(k+1)$: next estimation $\alpha\sigma_n^2(k)$: current estimation $\hat{\sigma}_n^2(k)$: current instantaneous estimation $\alpha<1$: exponential weighting factor The finite state machine 614 is configured to generate and control all the signals, such as, the reset, clock, timing and control signals, for the components as shown in FIG. 6 within the receiver 600.

The receiver 600 generally processes the signals received from the transmitter 300 as follows. Information from the first and second long contention symbols 200, 208 is stored in the appropriate memory banks. A first contention channel is identified and selected. The selected contention channel's subcarrier components of the first and second long contention symbols 200, 208 are retrieved from the corresponding memory banks. The phase ramp and LO phase offset are then removed from the respective subcarrier components by the removal module 604. Outputs from the removal module 604 are then forwarded to the FHT module 606. The FHT module 606, in turn, correlates the outputs received from the removal module 604 with a number of contention codes, i.e., a number of correlation coefficients are computed. The computed correlation coefficients and outputs from the threshold calculator 612 are then used by the code detector 610 to identify the transmitted contention code. The foregoing process may then be repeated for other contention channels.

If more than one (1) information-bearing long contention symbols 208 are received, the process described above is repeated for each subsequent long contention symbol 208. Each subsequent long contention symbol 208 is likewise decoded by reference to the first (calibration) long contention symbol 200. This provides a mechanism by which the information content of the FACH process may be increased without incurring the overhead of a linear increase in the time taken to transmit multiple FACH events.

The methods or algorithms described in connection with the embodiments disclosed herein may be embodied directly in hardware, in a software module executable by a processor, or in a combination of both, in the form of control logic, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, DVD or any other form of storage medium known in the art. A storage medium may be coupled to the processor such that the processor can read information from, and write information to, the storage medium. In the alternative, the storage medium may be integral to the processor.

The previous description of the disclosed embodiments is provided for purposes of illustration and description to enable any person skilled in the art to make or use the present invention. It is not intended to be exhaustive or to limit the invention to the precise form disclosed. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more". All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for".

What is claimed is:

1. A system for providing a fast access channel, comprising:

a transmitter configured to transmit a first long contention symbol and a second long contention symbol, the first long contention symbol being followed by the second long contention symbol; and a receiver configured to receive the first and second long contention symbols and determine a contention code and a contention channel transmitted with the contention code based on the first and second long contention symbols;

wherein each of the first and second long contention symbols includes a long cyclic prefix and a plurality of contention symbols;

wherein the plurality of contention symbols in the first long contention symbol are identical; and wherein the plurality of contention symbols in the second long contention symbol are identical.

2. The system of claim 1 wherein the plurality of contention symbols in each of the first and second long contention symbols include at least three contention symbols.

3. The system of claim 1 wherein the plurality of contention symbols in each of the first and second long contention symbols are constructed based on a 802.16a standard.

4. The system of claim 1 wherein a length of the long cyclic prefix of each of the first and second long contention symbols is an integer multiple times a length of a normal cyclic prefix based on a 802.16a standard.

5. The system of claim 1 wherein a length of the long cyclic prefix of each of the first and second long contention symbols equals a length of a normal cyclic prefix based on a 802.16a standard multiplied by a total number of contention symbols included in each of the plurality of contention symbols.

6. The system of claim 1 wherein the first long contention symbol includes a calibration contention code and the second long contention symbol includes a selected contention code.

7. The system of claim 1 wherein the receiver is further configured to measure a phase difference of the contention channel on a per subcarrier basis between the first and second long contention symbols and determine the contention code.

8. The system of claim 1 wherein the transmitter is further configured to transmit one or more additional long contention symbols; and wherein the receiver is further configured to receive the one or more additional long contention symbols and determine respective contention codes and contention channels transmitted with the respective contention codes based on the first long contention symbol, wherein the first long contention symbol includes a calibration contention code.

9. A system for providing a fast access channel, comprising:
   a receiver configured to:
      receive first and second long contention symbols, wherein the first long contention symbol is followed by the second long contention symbol, and each of the first and second long contention symbols includes a long cyclic prefix and a plurality of identical contention symbols;
      retrieve information relating to a selected contention channel from the first and second long contention symbols;
      remove phase ramp and phase offset information from the retrieved information to generate refined information relating to the selected contention channel;
      perform correlation coefficient computations between the refined information relating to the selected contention channel and a plurality of contention codes; and
      determine a contention code from the plurality of contention codes based on results of the correlation coefficient computations.

10. The system of claim 9 wherein the receiver is further configured to:
   compute a power level of the selected contention channel;
   compare the power level against a threshold value resulting in a comparison; and
   utilize the comparison to assist in determining the contention code.

11. The system of claim 9 wherein the receiver is further configured to use Fast Hadamard Transform to perform the correlation coefficient computations.

12. The system of claim 10 wherein the plurality of identical contention symbols in each of the first and second long contention symbols include at least three contention symbols.

13. The system of claim 9 wherein the plurality of identical contention symbols in each of the first and second long contention symbols are constructed based on a 802.16a standard.

14. The system of claim 9 wherein a length of the long cyclic prefix of each of the first and second long contention symbols is an integer multiple times a length of a normal cyclic prefix based on a 802.16a standard.

15. The system of claim 9 wherein a length of the long cyclic prefix of each of the first and second long contention symbols equals a length of a normal cyclic prefix based on a 802.16a standard multiplied by a total number of contention symbols included in each of the plurality of contention symbols.

16. The system of claim 9 wherein the first long contention symbol includes a calibration contention code and the second long contention symbol includes a selected contention code.

17. A method for providing a fast access channel, the method comprising:
   receiving a first long contention symbol, wherein the first long contention symbol includes a long cyclic prefix and a plurality of identical contention symbols;
   receiving a second long contention symbol, wherein the second long contention symbol includes a long cyclic prefix and a plurality of identical contention symbols; and
   determining a contention code and a contention channel on which the contention code was transmitted based on the first and second long contention symbols;
   wherein the first long contention symbol is followed by the second long contention symbol.

18. The method of claim 17 wherein the plurality of identical contention symbols in each of the first and second long contention symbols are constructed based on a 802.16a standard.

19. The method of claim 17 wherein a length of the long cyclic prefix of each of the first and second long contention symbols equals a length of a normal cyclic prefix based on a 802.16a standard multiplied by a total number of contention symbols included in each of the plurality of contention symbols.

20. The method of claim 17 wherein the first long contention symbol includes a calibration contention code and the second long contention symbol includes a selected contention code.

21. A device for operating on a fast access channel, comprising a receiver configured to:
   receive a first long contention symbol, wherein the first long contention symbol includes a long cyclic prefix and a plurality of identical contention symbols;
   receive a second long contention symbol, wherein the second long contention symbol includes a long cyclic prefix and a plurality of identical contention symbols; and
   determine a contention code and a contention channel on which the contention code was transmitted based on the first and second long contention symbols;
   wherein the first long contention symbol is followed by the second long contention symbol.

22. The method of claim 21 wherein the plurality of identical contention symbols in each of the first and second long contention symbols are constructed based on a 802.16a standard.

23. The method of claim 21 wherein a length of the long cyclic prefix of each of the first and second long contention symbols equals a length of a normal cyclic prefix based on a 802.16a standard multiplied by a total number of contention symbols included in each of the plurality of contention symbols.

24. The method of claim 21 wherein the first long contention symbol includes a calibration contention code and the second long contention symbol includes a selected contention code.

25. A device for operating on a fast access channel, comprising a transmitter configured to:
- transmit a first long contention symbol, wherein the first long contention symbol includes a long cyclic prefix and a plurality of identical contention symbols; and
- transmit a second long contention symbol, wherein the second long contention symbol includes a long cyclic prefix and a plurality of identical contention symbols;
- wherein the first and second long contention symbols are for a receiver to determine a contention code and a contention channel on which the contention code was transmitted based on the first and second long contention symbols; and
- wherein the first long contention symbol is followed by the second long contention symbol.

26. The method of claim 25 wherein the plurality of identical contention symbols in each of the first and second long contention symbols are constructed based on a 802.16a standard.

27. The method of claim 25 wherein a length of the long cyclic prefix of each of the first and second long contention symbols equals a length of a normal cyclic prefix based on a 802.16a standard multiplied by a total number of contention symbols included in each of the plurality of contention symbols.

28. The method of claim 25 wherein the first long contention symbol includes a calibration contention code and the second long contention symbol includes a selected contention code.

29. A system for providing a fast access channel using a contention symbol comprising a plurality of contention channels, wherein at least one of the plurality of contention channels is assigned to one of a plurality of transmitters, and wherein each of the plurality of contention channels is configured to carry a contention code selected from a plurality of contention codes, the system comprising a receiver configured to:
- receive a first long contention symbol and a second long contention symbol, each including a long cyclic prefix and a plurality of identical contention symbols;
- determine which contention channel of the plurality of contention channels is carrying a contention code based on at least one of the first and second long contention symbols;
- determine the contention code based on the determined contention channel and the first and second long contention symbols, wherein the determined contention code comprises variable information; and
- determine a transmitter that transmitted the determined contention code based on the determined contention channel.

30. The system of claim 29 wherein each of plurality of contention channels comprises a subset of a plurality of sub-carriers.

31. The system of claim 29 wherein at least one of the plurality of contention channels is assigned to a second one of the plurality of transmitters, wherein the receiver is further configured to:
- determine which second contention channel of the plurality of contention channels is carrying a second contention code based on at least one of the first and second long contention symbols;
- determine the second contention code based on the determined second contention channel and the first and second long contention symbols, wherein the determined second contention code comprises variable information; and
- determine a second transmitter that transmitted the determined second contention code based on the determined second contention channel.

32. The system of claim 29 wherein at least two of the plurality of contention channels are assigned to the transmitter, wherein the receiver is further configured to:
- determine which second contention channel of the plurality of contention channels is carrying a second contention code based on at least one of the first and second long contention symbols; and
- determine the second contention code based on the determined second contention channel and the first and second long contention symbols, wherein the determined second contention code comprises variable information.

* * * * *